United States Patent
Kramer et al.

(10) Patent No.: US 8,218,419 B2
(45) Date of Patent: Jul. 10, 2012

(54) SIMULTANEOUS ESTIMATION OF MULTIPLE CHANNEL COEFFICIENTS USING A COMMON PROBING SEQUENCE

(75) Inventors: Gerhard Guenter Theodor Kramer, Los Angeles, CA (US); Carl Jeremy Nuzman, Union, NJ (US)

(73) Assignee: Alcatel Lucent, Paris (FR)

( * ) Notice: Subject to any disclaimer, the term of this patent is extended or adjusted under 35 U.S.C. 154(b) by 246 days.

(21) Appl. No.: 12/370,148

(22) Filed: Feb. 12, 2009

(65) Prior Publication Data
US 2010/0202281 A1   Aug. 12, 2010

(51) Int. Cl.
 *H04J 1/12* (2006.01)
(52) U.S. Cl. ........ 370/201; 375/219; 375/220; 375/221; 375/222; 375/223; 375/257; 375/258; 375/259; 375/285; 379/1.01
(58) Field of Classification Search ............... 370/201; 375/219–223, 316–352, 257–259, 285; 379/414–417, 1.01–35, 406.01, 406.16
See application file for complete search history.

(56) References Cited

U.S. PATENT DOCUMENTS

| | | | |
|---|---|---|---|
| 6,693,992 B2 | 2/2004 | Jones et al. | |
| 6,829,293 B2 | 12/2004 | Jones et al. | |
| 6,985,521 B1 | 1/2006 | Rezvani et al. | |
| 2006/0133534 A1* | 6/2006 | Verlinden et al. | 375/285 |
| 2006/0245509 A1* | 11/2006 | Khan et al. | 375/260 |
| 2008/0130478 A1* | 6/2008 | Schenk | 370/201 |
| 2008/0285740 A1* | 11/2008 | Schelstraete et al. | 379/406.06 |
| 2009/0059780 A1* | 3/2009 | De Lind Van Wijngaarden et al. | 370/201 |
| 2009/0175156 A1* | 7/2009 | Xu | 370/201 |
| 2010/0177855 A1* | 7/2010 | Ashikhmin et al. | 375/346 |

FOREIGN PATENT DOCUMENTS

| | | |
|---|---|---|
| EP | 1843499 A1 | 10/2007 |
| EP | 1940140 A1 | 7/2008 |
| WO | 2007/011138 A2 | 1/2007 |
| WO | PCT/US2010/023709 | 5/2010 |

OTHER PUBLICATIONS

X. Hou et al., "A Time-Domain Approach for Channel Estimation in MIMO-OFDM-Based Wireless Networks," IEICE Trans. Commun., Jan. 2005, pp. 3-9, vol. E88-B, No. 1.

(Continued)

*Primary Examiner* — Hassan Kizou
*Assistant Examiner* — Charles C Jiang
(74) *Attorney, Agent, or Firm* — Ryan, Mason & Lewis, LLP

(57) ABSTRACT

An access node of a communication system comprises a plurality of transmitters adapted for communication with at least one receiver. The access node is operative to simultaneously estimate channel coefficients between multiple ones of the transmitters and the receiver, and to utilize the estimated channel coefficients to control at least one data signal sent by at least one of the multiple transmitters to the receiver. In the process of simultaneously estimating the channel coefficients, the access node transmits a plurality of distinct probing signals, each of which is generated based on a distinct combination of a common probing sequence and a selected one of a plurality of different frequency expansions. The access node may comprise at least a portion of at least one central office of a DSL communication system.

21 Claims, 10 Drawing Sheets

OTHER PUBLICATIONS

ITU Recommendation, COM 15-C 177-E, "G.vds12: Pilot Sequence Assisted Vector Channel Estimation," Study Group 15—Contribution 177, Upzide Labs, pp. 1-6, Oct. 2006.

ITU Recommendation, COM 15-C 685-E, "G.vector: Advantages of Using a Startup Sequence for Joining Event," Study Group 15—Contribution 685, Infineon Technologies North American, pp. 1-3, Jan. 2008.

U.S. Appl. No. 12/352,896, filed in the name of A. Ashikhmin et al. on Jan. 13, 2009 and entitled "Power Control Using Denoised Crosstalk Estimates in a Multi-Channel Communication System."

U.S. Appl. No. 12/060,653, filed in the name of A. Ashikhmin et al. on Apr. 1, 2008 and entitled "Fast Seamless Joining of Channels in a Multi-Channel Communication System."

P. Whiting et al., "DSL Crosstalk Coefficient Acquisition Using SNR Feedback," IEEE Globecom, Nov. 2008, pp. 1-5.

Upzide LABS, "G.vds12: Pilot Sequence Assisted Vector Channel Estimation," ITU-T Study Group 15—Contribution 177; COM 15-C 177-E, Oct. 2006, pp. 1-6.

* cited by examiner

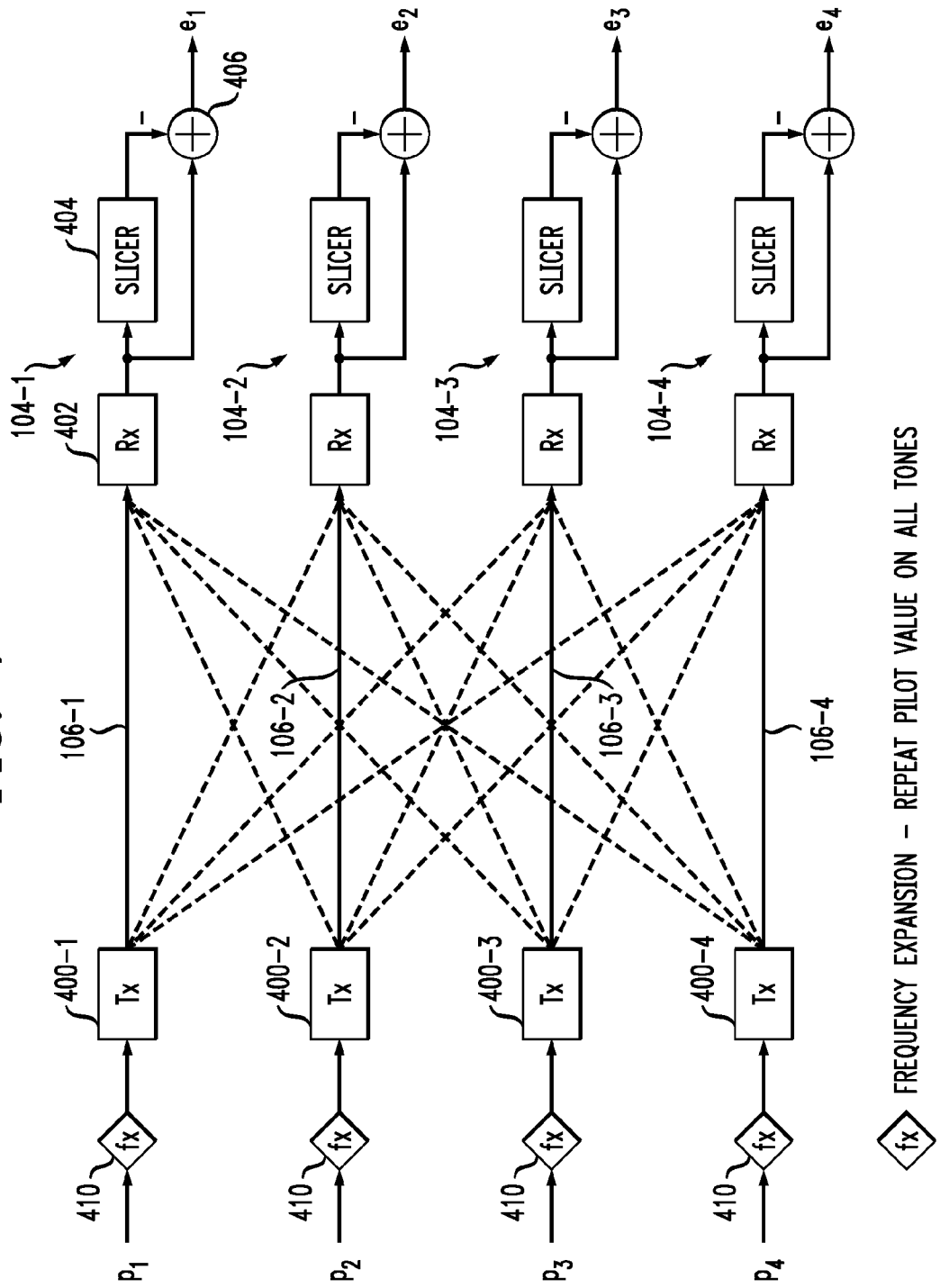

SIMULTANEOUS ESTIMATION OF MULTIPLE CHANNEL COEFFICIENTS USING A COMMON PROBING SEQUENCE

FIELD OF THE INVENTION

The present invention relates generally to communication systems, and more particularly to techniques for controlling crosstalk between communication channels in such systems.

BACKGROUND OF THE INVENTION

As is well known, a communication system may utilize multiple communication channels to communicate signals between transmitters and receivers of the system. For example, multiple channels may be used to separate different transmitted data signals from one another, or to provide an increased data rate.

A problem that can arise in multiple channel communication systems relates to crosstalk between the various channels, also referred to as inter-channel crosstalk. For example, digital subscriber line (DSL) broadband access systems typically employ discrete multi-tone (DMT) modulation over twisted-pair copper wires. One of the major impairments in such systems is crosstalk between multiple subscriber lines within the same binder or across binders. Thus, a transmission on one subscriber line may be detected on other subscriber lines, leading to interference that can degrade the throughput performance of the system. More generally, a given "victim" channel may experience crosstalk from multiple "disturber" channels, again leading to undesirable interference.

Dynamic spectrum management (DSM) techniques have been developed in order to combat interference and to maximize the effective throughput and reach of a DSL system. Lower level DSM techniques, commonly referred to as Level 1 and Level 2 techniques, generally adjust the power levels associated with a given subscriber line in an attempt to minimize interference. Level 3 techniques are more sophisticated, and allow active cancellation of inter-channel crosstalk through the use of a precoder. The precoder is typically used to achieve crosstalk cancellation for downstream communications between a central office (CO) and customer premises equipment (CPE). It is also possible to implement crosstalk control for upstream communications from the CPE to the CO, using so-called post-compensation techniques.

One known approach to estimating crosstalk coefficients for downstream power control or crosstalk cancellation in a DSL system involves transmitting distinct pilot signals over respective subscriber lines between a CO and respective CPE of the system. Error feedback from the CPE based on the transmitted pilot signals is then used to estimate crosstalk. Other known approaches involve perturbation of precoder coefficients and feedback of signal-to-noise ratio (SNR) or other interference information.

Crosstalk estimates are commonly utilized in situations in which it is necessary to "join" an additional line to a group of active lines in a DSL system. For example, it may become necessary to activate one or more inactive lines in a synchronization group that already includes multiple active lines. Such joining of an additional line may require that the power control or precoder be adjusted accordingly in order to optimize system performance.

Crosstalk estimates are also used in a variety of other line management applications, including determining whether or not to precode, and setting power levels on victim and disturber lines.

Accordingly, it is important to have accurate crosstalk estimates that can be generated quickly and efficiently.

SUMMARY OF THE INVENTION

The present invention in one or more illustrative embodiments provides techniques for simultaneous estimation of channel coefficients, using a plurality of distinct probing signals generated from a common probing sequence. Such channel coefficients can be used as crosstalk estimates for controlling crosstalk through power control or precoding, and are also suitable for use in numerous other signal control applications.

In accordance with one aspect of the invention, an access node of a communication system comprises a plurality of transmitters adapted for communication with at least one receiver. The access node may comprise, for example, at least a portion of at least one CO of a DSL communication system. The access node is operative to simultaneously estimate channel coefficients between multiple ones of the transmitters and the receiver, and to utilize the estimated channel coefficients to control at least one data signal sent by at least one of the multiple transmitters to the receiver. In the process of simultaneously estimating the channel coefficients, the access node transmits a plurality of distinct probing signals, each of which is generated based on a distinct combination of a common probing sequence and a selected one of a plurality of different frequency expansions.

Multiple common probing sequences may be used, with each such common sequence being combined with different frequency expansions to generate respective ones of a plurality of distinct probing signals.

In an illustrative error feedback embodiment, the distinct probing signals may comprise respective pilot signals transmitted to respective receivers over respective channels of the system, and the common probing sequence may comprise a common pilot sequence. The simultaneous estimation of channel coefficients in this embodiment may involve, for example, processing error samples fed back from the receivers based on the transmitted pilot signals.

In an illustrative SNR feedback embodiment, the distinct probing signals may comprise respective perturbation signals applied to respective precoder coefficients, and the common probing sequence may comprise a common perturbation sequence. The simultaneous estimation of channel coefficients in this embodiment may involve, for example, processing SNR reports or other interference information fed back from the receiver based on the transmitted perturbation signals.

Advantageously, the illustrative embodiments allow crosstalk estimates to be obtained much more quickly than would otherwise be possible, resulting in enhanced speed of operation within the system. For example, a given line can be joined to a group of active lines in substantially less time than would otherwise be required.

These and other features and advantages of the present invention will become more apparent from the accompanying drawings and the following detailed description.

BRIEF DESCRIPTION OF THE DRAWINGS

FIGS. 4 and 5 are block diagrams illustrating an error feedback approach to obtaining crosstalk estimates without the use of simultaneous estimation of multiple channels using a common probing sequence.

DETAILED DESCRIPTION OF THE INVENTION

The present invention will be illustrated herein in conjunction with exemplary communication systems and associated techniques for obtaining crosstalk estimates in such systems. The crosstalk estimates may be used in conjunction with joining subscriber lines or other communication channels to a group of active channels in such systems, or for other line management functions. It should be understood, however, that the invention is not limited to use with the particular types of communication systems and channel estimation applications disclosed. The invention can be implemented in a wide variety of other communication systems, using alternative techniques for obtaining channel coefficient estimates, and in numerous alternative applications involving the use of such estimates. For example, although illustrated in the context of DSL systems based on DMT modulation, the disclosed techniques can be adapted in a straightforward manner to a variety of other types of wired or wireless communication systems, including cellular systems, multiple-input multiple-output (MIMO) systems, Wi-Fi or WiMax systems, etc. The techniques are thus applicable to other types of orthogonal frequency division multiplexing (OFDM) systems outside of the DSL context.

Figure 1:
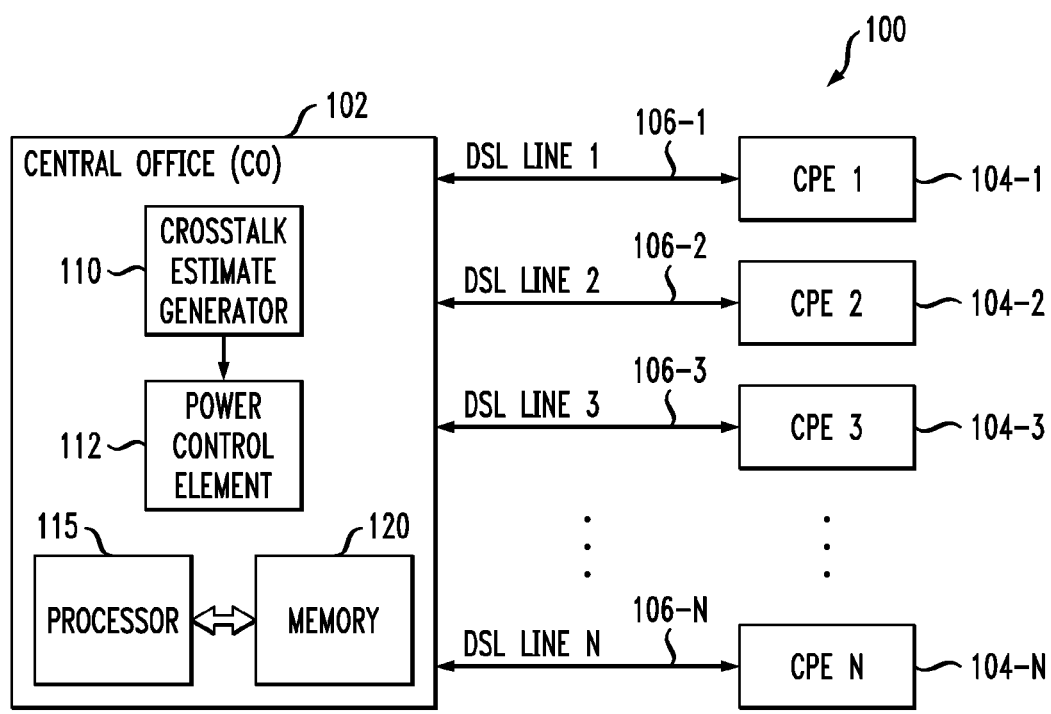
FIG. 1 is a block diagram of a multi-channel communication system in an illustrative embodiment of the invention.

FIG. 1 shows a communication system 100 comprising a central office (CO) 102 and customer premises equipment (CPE) 104. The CPE 104 more particularly comprises N distinct CPE elements that are individually denoted CPE 1, CPE 2, . . . CPE N, and are further identified by respective reference numerals 104-1, 104-2, . . . 104-N as shown. A given CPE element may comprise, by way of example, a modem, a computer, or other type of communication device, or combinations of such devices. The CO 102 is coupled to these CPE elements via respective subscriber lines denoted Line 1, Line 2, . . . Line N, each of which may comprise, for example, a twisted-pair copper wire connection.

In an illustrative embodiment, fewer than all of the N lines 106-1 through 106-N are initially active lines, and at least one of the N lines is a "joining line" that is to be activated and joined to an existing group of active lines. The initially active lines are an example of what is referred to herein as a "group" of active lines. Such a group may be, for example, a synchronization group, which may also be referred to as a precoding group, or any other type of grouping of active lines.

Communications between the CO 102 and the CPE 104 include both downstream and upstream communications for each of the active lines. The downstream direction refers to the direction from CO to CPE, and the upstream direction is the direction from CPE to CO. Although not explicitly shown in FIG. 1, it is assumed without limitation that there is associated with each of the subscriber lines of system 100 a CO transmitter and a CPE receiver for use in communicating in the downstream direction, and a CPE transmitter and a CO receiver for use in communicating in the upstream direction. The corresponding transmitter and receiver circuitry can be implemented in the CO and CPE using well-known conventional techniques, and such techniques will not be described in detail herein.

The CO 102 in the present embodiment comprises a crosstalk estimate generator 110 coupled to a power control element 112. The CO utilizes the crosstalk estimate generator to obtain crosstalk estimates for respective ones of at least a subset of the lines 106. The power control element 112 is used to adjust power levels of signals transmitted over one or more of the lines based on the crosstalk estimates.

It should be understood that power control is just one illustrative example of an application in which the crosstalk estimates generated in CO 102 can be utilized. Other applications include, for example, pre-compensation of downstream signals transmitted from the CO to the CPE, and post-compensation of upstream signals received in the CO from the CPE. Pre-compensation techniques may be implemented using a precoder, an example of which will be described in conjunction with FIG. 2. More generally, crosstalk estimates generated in the manner described herein can be utilized in any application involving coordinating signals sent from multiple transmitters in order to improve system performance by increasing data rates, reducing errors, etc.

The crosstalk estimate generator 110 may be configured to generate crosstalk estimates from error samples, SNR values or other types of measurements fed back to the CO 102 from the CPE 104. Examples of particular techniques for generating crosstalk estimates will be described in detail below.

In other embodiments, crosstalk estimates may be generated outside of the CO 102 and supplied to the CO for further processing. For example, such estimates may be generated in the CPE 104 and returned to the CO for use in power control, precoding, post-compensation or other applications.

A crosstalk estimate is an example of what is more generally referred to herein as a "channel coefficient estimate," an "estimated channel coefficient," or simply a "channel estimate."

The crosstalk estimate generator 110 may incorporate denoising functionality for generating denoised crosstalk estimates. Examples of crosstalk estimate denoising techniques suitable for use with embodiments of the invention are described in U.S. patent application Ser. No. 12/352,896, filed Jan. 13, 2009 and entitled "Power Control Using Denoised Crosstalk Estimates in a Multi-Channel Communication System," which is commonly assigned herewith and incorporated by reference herein. It is to be appreciated, however, that the present invention does not require the use of any particular denoising techniques. Illustrative embodiments to be described herein may incorporate denoising functionality using frequency filters as part of a channel coefficient estimation process.

As will be described in greater detail below, the CO 102 is configured to implement a technique for simultaneous estimation of multiple ones of the channels 106 using a common probing sequence. In implementing such a technique, the CO transmits distinct probing signals and obtains crosstalk estimates based on measurements made in the CPE 104. The CO 102 then adjusts power levels, performs precoding or otherwise controls data signal transmission based on the crosstalk estimates. The simultaneous estimation using a common probing sequence may be achieved by generating at least first and second distinct probing signals from the common probing sequence. This generally involves applying a first frequency expansion to the common probing sequence to generate the first distinct probing signal and applying a second frequency expansion different than the first frequency expansion to the common probing sequence to generate the second distinct probing signal. The first and second distinct probing signals are transmitted simultaneously, for example, on respective channels or as respective perturbations of precoder coefficients associated with a particular channel. Corresponding measurements such as error samples or SNR values are fed back from the CPE to the CO and utilized to generate crosstalk estimates in crosstalk estimate generator 110.

Multiple common probing sequences may be used, with each such common sequence being combined with different frequency expansions to generate respective ones of a plurality of distinct probing signals. For example, one embodiment may comprise at least first and second common probing sequences, and a set of F different frequency expansions. The distinct probing signals generated in such an embodiment may include a first set of F probing signals generated by applying respective ones of the F different frequency expansions to the first common probing sequence, and a second set of F probing signals generating by applying respective ones of the same set of F different frequency expansions to the second common probing sequence. Of course, this approach may be extended to more than two common probing sequences. The approach generally allows multiple distinct probing signals to be generated as combinations of different frequency expansions and a single probing sequence. More detailed examples will be described in conjunction with FIGS. 4 through 11.

The term "simultaneous estimation" as used herein is intended to encompass, by way of example, arrangements in which the probing signals on which estimates are based are transmitted at substantially the same time within the system, as in the case of substantially simultaneous transmission of pilot signals or perturbation signals. Accordingly, all aspects of a given estimation process used to generate multiple channel coefficient estimates need not occur at the same time for each estimate in order for the estimation to be simultaneous as that term is used herein.

The CO 102 further comprises a processor 115 coupled to a memory 120. The memory may be used to store one or more software programs that are executed by the processor to implement the functionality described herein. For example, functionality associated with crosstalk estimate generator 110 and power control element 112 may be implemented at least in part in the form of such software programs. The memory is an example of a computer-readable storage medium that stores executable program code.

The CO 102 or a portion thereof may be viewed as an example of what is more generally referred to herein as an "access node" of a communication system. A single access node may, but need not, comprise multiple COs or portions of one or more COs. Another example of a possible access node is a DSL access multiplexer (DSLAM). Thus, the term "access node" as used herein is intended to be broadly construed so as to encompass, for example, a particular element within a CO, such as a DSLAM, or the CO itself, as well as other types of access point elements in systems that do not include a CO.

In the illustrative embodiment of FIG. 1 the lines 106 are all associated with the same CO 102 which may comprise a single access node. However, in other embodiments, these lines may be distributed across multiple access nodes. Different ones of such multiple access nodes may be from different vendors. For example, it is well known that in conventional systems, several access nodes of distinct vendors can be connected to the same bundle of DSL lines. Under these and other conditions, the various access nodes may have to interact with one another in order to achieve optimal interference cancellation.

The terms "customer premises equipment" or CPE should be construed generally as including other types of user equipment in the context of non-DSL systems.

An implementation of the system 100 of FIG. 1 that includes a precoder will be described below with reference to FIG. 2. Such a precoder is used for active crosstalk cancellation for downstream communications between the CO 102 and CPE 104. However, it should be emphasized that the disclosed techniques can be adapted in a straightforward manner for use in controlling crosstalk for upstream communications. Furthermore, the techniques are applicable to systems involving symmetric communications in which there is no particular defined downstream or upstream direction.

Figure 2:
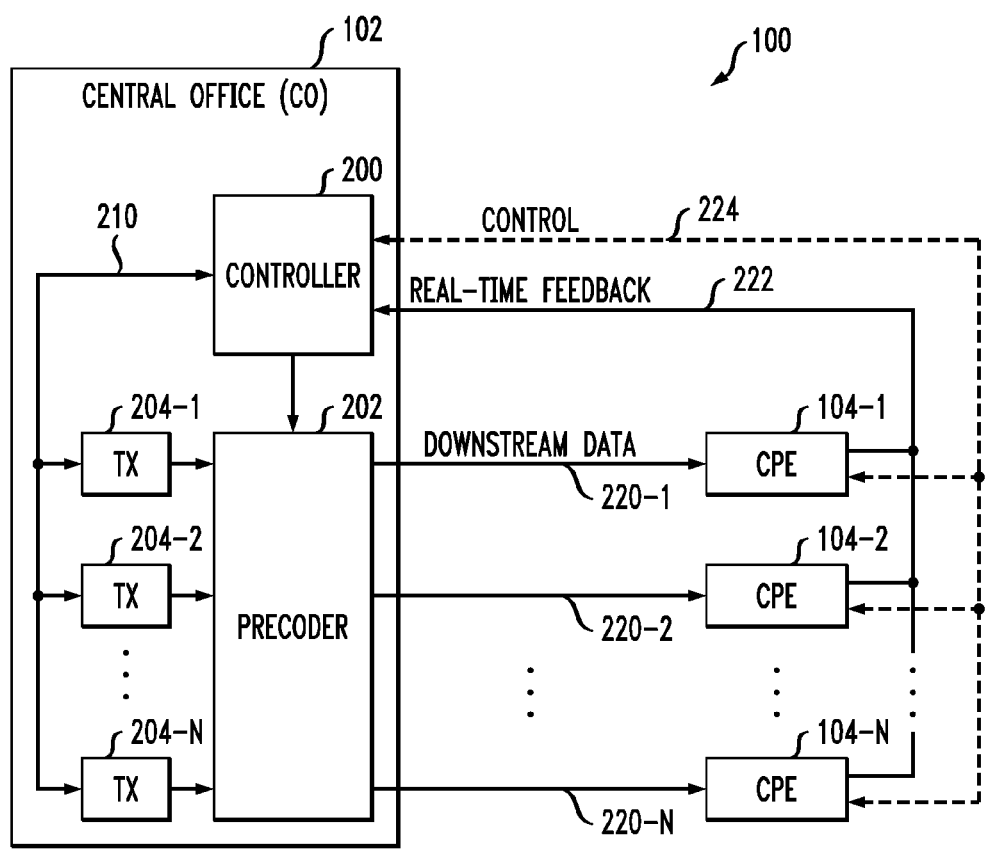
FIG. 2 shows a more detailed view of one possible implementation of the FIG. 1 system.

Referring now to FIG. 2, the CO 102 is shown in this particular implementation as including a controller 200, a precoder 202, and a set of N transmitters denoted 204-1 through 204-N. The controller is coupled to the precoder and the transmitters for controlling the transmission of downstream signals in system 100. The transmitters generate respective streams of DMT symbols that are transmitted over downstream data paths 220-1 through 220-N to respective CPE 104-1 through 104-N. The precoder 202 utilizes crosstalk estimates to adjust the downstream signals prior to transmission in a manner that tends to cancel out the crosstalk introduced in traversing the downstream data paths. Any of a wide variety of known precoding techniques may be used to implement crosstalk cancellation for multiple joining and active lines of the type described herein. Such precoding techniques are well understood by those skilled in the art and therefore will not be described in detail.

The downstream data paths 220 shown in FIG. 2 represent downstream signal paths of the respective DSL lines 106 shown in FIG. 1. The system 100 also includes real-time feedback signal paths 222, which may be upstream signal paths of respective active ones of the DSL lines 106 shown in FIG. 1. It should be noted that a joining line may not have such a real-time feedback signal path until such time as the line is joined to the group and becomes fully active, although in other embodiments a joining line could, for example, be provided with a real-time feedback signal path during an initialization mode. The controller 200 supplies control signals to the CPE via control signal paths 224, which may represent, for example, one or more designated and otherwise conventional control channels within the DSL lines 106.

It should be noted that the controller 200 and precoder 202 may be implemented in whole or in part using the processor 115 of FIG. 1. For example, portions of the functionality associated with the elements 200 and 202 may be implemented in the form of software running on processor 115.

Each of the CPE 104 may be configurable into multiple modes of operation responsive to control signals supplied by the CO 102 over control signal paths 224, as described in U.S. patent application Ser. No. 12/060,653, filed Apr. 1, 2008 and entitled "Fast Seamless Joining of Channels in a Multi-Channel Communication System," which is commonly assigned herewith and incorporated by reference herein. Such modes of operation may include, for example, a joining mode and a tracking mode. However, this type of multiple mode operation is not a requirement of the present invention.

Illustrative embodiments of the invention will be described herein with reference to DMT tones. However, the term "tone" as used herein is intended to be broadly construed so as to encompass not only DMT tones but also other types of sub-carriers of other multi-carrier communication systems.

It is assumed for illustrative purposes only that downstream transmission over each of the N channels 106 in the system 100 is implemented using DMT modulation with K tones per channel. The nature of the channel from one transmitter to one receiver on a particular tone can be described by a complex coefficient. Accordingly, $N^2K$ channel coefficients are needed in order to obtain the desired crosstalk estimates.

A typical conventional approach is to transmit pilot signals over the respective channels and to make measurements at the receivers. More specifically, mutually orthogonal pilot signals are transmitted over the channels, and then the received signals are correlated with each pilot signal in turn. This procedure is followed on each tone in parallel, i.e., the same pilot signal value is sent on each tone of a given line. Since $N^2K$ coefficients are being estimated, and NK measurements can be made in each so-called "channel use," N channel uses are required. One can choose N pilot sequences $p_1, p_2, \ldots, p_N$. Each pilot sequence is a sequence of L complex numbers, $p_1[1], p_1[2], \ldots p_1[L]$, and each sequence is assigned to a different transmitter. Transmitter i sends the pilot sequence $p_1$ by transmitting each of the L complex numbers in order. On a particular tone k at time t, a given receiver observes a superposition of signals from the N transmitters, plus additional measurement noise. The received signal is given by:

$$s[t,k] = \sum_{n=1}^{N} g_n[k]p_n[t] + w[t,k]$$

where $g_n[k]$ is the channel coefficient from transmitter n on tone k and $w[t,k]$ is noise. As indicated previously, in order for the given receiver to distinguish between signals sent by different transmitters, the pilot signals are usually chosen to be orthogonal to each other, such that $$\sum_{t=1}^{L} p_n[t]p_m[t]^* = 0$$

whenever n is not equal to m.

Then each channel coefficient in turn can be obtained, for example, by correlating the received signal with the appropriate pilot signal, and normalizing by the signal power. The processed estimate is $$r_n[k] = \frac{\sum_{t=1}^{L} s[t,k]p_n[t]^*}{\sum_{t=1}^{L} p_n[t]p_n[t]^*} = g_n[k] + \tilde{w}_n[k]$$

where $\tilde{w}[k]$ is residual estimation noise on tone k.

A significant drawback of the conventional approach described above is that L, which denotes the length of the pilot sequences, and thereby the number of channel uses, must be at least as large as N. In order to allow the pilot sequences to be transmitted simultaneously, the sequences must be linearly independent, and hence the length of each sequence must be at least as long as the number of sequences. This is required in order to ensure that the pilot sequences are mutually orthogonal, or more generally to ensure that the pilot sequence correlation matrix is invertible. As a result, the more distinct pilot sequences that are used, the longer those sequences need to be. Accordingly, the number of channel uses required to obtain the desired estimates in this arrangement is the same as the number of channels. Since each channel use can take a significant amount of time, on the order of 1/16 of a second in typical DSL systems, the fact that L must be at least as large as N causes problems such as requiring an excessive amount of time to join a new line to a group of active lines, or requiring an excessive amount of time to achieve optimum performance on a new line that has recently joined a group of active lines.

Illustrative embodiments of the invention overcome this drawback of conventional practice through the previously-mentioned simultaneous estimation of multiple channels using a common probing sequence. This allows the number of different probing sequences to be reduced, such that the probing sequence length required to achieve linear independence is also reduced.

In one such embodiment, pilot sequences are transmitted that depend on tone as well as time. The value transmitted at time t on tone k may be of the form:

$$p[t,k]=u[k]p[t]$$

where u[k] denotes a frequency sequence. This embodiment utilizes F different frequency sequences $u_1[k], \ldots, u_F[k]$ and L mutually orthogonal time sequences $p_1[t], \ldots, p_L[t]$. Now, one does not need a unique time sequence for each transmitter. Instead, each transmitter needs to have a unique time/frequency sequence pair. This means that channels from N transmitters can be estimated in only L=N/F channel uses.

A time sequence is an example of what is more generally referred to herein as a "probing sequence," and a frequency sequence is an example of what is more generally referred to herein as a "frequency expansion." The simultaneous estimation techniques disclosed herein generally involve generating and transmitting distinct probing signals, each of which is generated based on a distinct combination of a common probing sequence and a selected one of a plurality of different frequency expansions.

To obtain estimates from measurements, one performs a time correlation, as in the conventional approach described above, but then also performs a smoothing operation over tones. The smoothing operation also has the property of reducing the measurement noise. This operation is described in more detail below.

The performance gain depends on the number of distinguishable frequency sequences F. This is determined by the intrinsic smoothness of the crosstalk channel. We will say that the channel has a coherence bandwidth of Q tones if the coefficients for a band of K tones can be described using only K/Q parameters. In this case, it is typically possible to find as many as F=Q distinguishable frequency sequences. The presence of coherence bandwidth Q means that only $N^2K/Q$ parameters need to be estimated to describe the channels. Since NK measurements are obtained in each channel use, it is possible to obtain the needed estimates in N/Q channel uses, which is a significant improvement over the conventional approach.

Figure 3A:
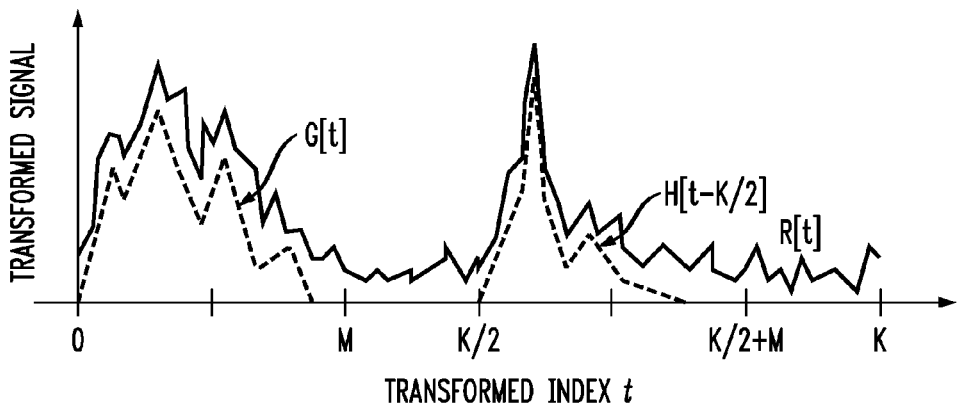
FIGS. 3A through 3C are plots illustrating a technique for simultaneous crosstalk estimation of multiple channels using a common probing sequence.
Figure 3B:
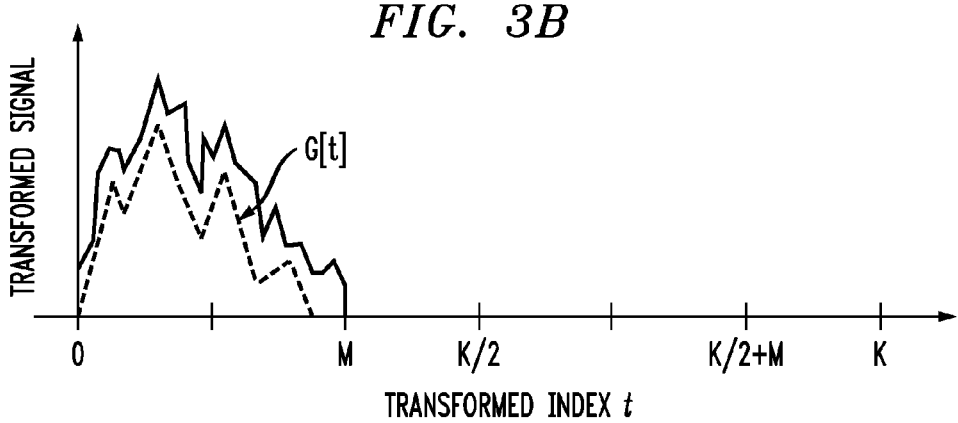

An example using F=2 distinct frequency sequences and Fourier-based smoothing will now be described with reference to FIGS. 3A through 3C.

Assume that we wish to learn the crosstalk from N=48 transmitters into a given receiver. Normally, using time sequences, 48 sequences of length L=48 would be required. Using the techniques of the invention, 24 sequences of length L=24 can instead be used. This means that pairs of two transmitters must share the same time sequence. They will be able to share the same time sequence because they have distinct frequency sequences.

Consider two such transmitters that share a common time sequence p[t], t=1, ..., L. Let g[k] represent the crosstalk channel from the first transmitter, and let h[k] represent the channel from the second transmitter, as a function of tone k, for k=0, ..., K−1. Let G[t] represent the Discrete Fourier Transform (DFT) of g[k], and likewise let H[t] be the DFT of h[k]. Assume that both g[k] and h[k] have a coherence bandwidth of at least Q tones, meaning that G[t] and H[t] are both approximately zero for t=M, ..., K−1, where M=K/Q. Also assume that Q is at least two, i.e., M is less than K/2.

The first transmitter sends pilot sequence p[t] on each tone, as is normally done in the conventional approach. The second transmitter sends the pilot sequence p[t] on even-numbered tones, and the pilot sequence −p[t] on odd-numbered tones. In other words, the two frequency sequences are $u_1[k]=1$ and $u_2[k]=(-1)^k$, i.e., $p_1[t,k]=p[t]$ and $p_2[t,k]=(-1)^k p[t]$.

Next, the signals measured at the receiver are correlated with the time sequence p[t] and normalized by the signal power in the same way as in the conventional approach. The result after correlation is a signal of the form $$r[k]=g[k]+(-1)^k h[k]+\tilde{w}[k]$$

where $\tilde{w}[k]$ is measurement noise. The time correlation eliminates the influence of the 46 transmitters that use one of the 23 time sequences that are orthogonal to p[t]. All that remains is to process r[k] to extract the two channel responses g[k] and h[k] that shared the same time sequence, p[t].

We have recognized that because of the smoothness of g[k] and h[k], unbiased estimates of both signals can be extracted from r[k]. To do this, one first takes the DFT of r[k] to obtain R[t]=G[t]+H[t−K/2]+W[t]. As is usual when working with the DFT, by H[t−x] we mean a cyclic shift of H[t]. Because g[k] and h[k] are smooth, G[t] and H[t−K/2] occupy different sections of the transform R[t]. As depicted in FIG. 3A, information about G[t] is confined to R[t] in the range t=0, ..., M−1 while information about H[t−K/2] is confined to the range t=K/2, ..., K/2+M−1. To recover an estimate of g[k], one first denoises by setting R[t]=0 for t>M−1, as depicted in FIG. 3B. This completely removes the influence of h[k]. Applying the inverse discrete Fourier transform (IDFT), one obtains an unbiased estimate of g[k], with reduced noise. To recover an estimate of h[k], one performs a cyclic shift to obtain $$R[t+K/2]=G[t+K/2]+H[t]+W[t+K/2]$$

Figure 3C:
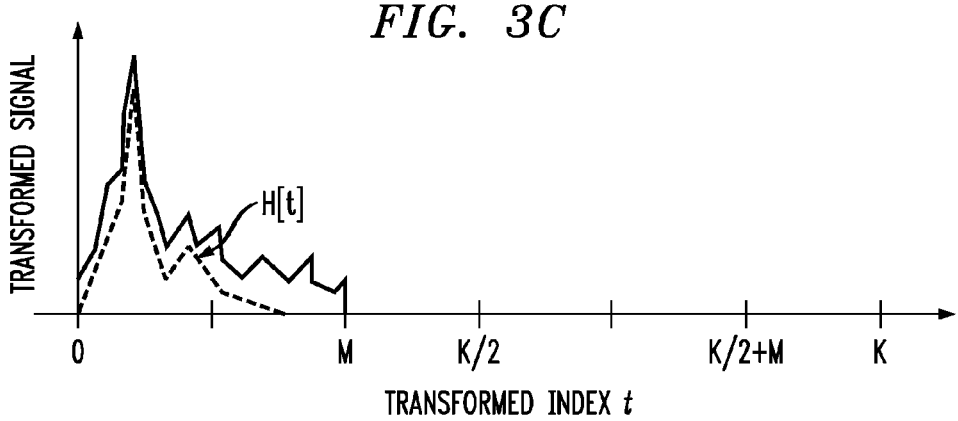

Now denoising this signal as depicted in FIG. 3C, the influence of g[k] is completely eliminated. Applying the IDFT, one obtains an unbiased estimate of h[k], with reduced noise.

The larger the ratio Q=K/M, the greater the number of different frequency sequences that can be used, and thus the greater the number of transmitters that can share the same pilot sequence. In general, one can use F=Q frequency sequences defined by $$u_q[k]=\exp(j2\pi kq/Q), q=0,\ldots,Q-1$$

where the DFT of $u_q[k]g[k]$ is G[t−qK/Q].

It is also possible to define variations on this approach that are appropriate for different types of smoothness models and denoising operations. Examples of other models could include the discrete cosine transform, the Hadamard transform, piecewise linear models, etc. There can be tradeoffs among different approaches. For example, the Hadamard transform has very low complexity, but values of F that can be achieved with this transform will typically be smaller than those that can be achieved with the DFT. The simultaneous estimation technique does not need to be applied across large bands. Smoothing can instead be done locally among groups of tones, which can be beneficial from the point of view of complexity and parallelization.

The foregoing example was in the context of an error feedback approach. Further details of such an approach will be described below in conjunction with FIGS. 4 through 7. However, the simultaneous estimation techniques of the invention can be adapted in a straightforward manner to other contexts, such as crosstalk estimation by SNR feedback. In an SNR feedback approach, there are no pilot signals as such, but there are perturbation signals applied to precoder coefficients. In conventional practice, the same perturbation value is applied on all tones, and that perturbation value is applied to one line at a time. A given SNR feedback embodiment of the present invention instead applies the same perturbation value to multiple lines at the same time, using frequency sequences unique to each line. Although the type of probing signal is different in this case, the mathematical model is similar, and the procedure of transformation, shifting, and denoising is substantially the same. More detailed examples of an SNR feedback approach in accordance with an illustrative embodiment of the invention will be described below in conjunction with FIGS. 8 through 11.

The term "probing signal" as used herein is intended to be construed generally, so as to encompass both the pilot signals used in error feedback embodiments and the perturbation signals used in SNR feedback embodiments. More specifically, in one or more of the error feedback embodiments, distinct probing signals may comprise respective pilot signals generated by applying different frequency expansions to a common pilot sequence. Similarly, in one or more of the SNR feedback embodiments, distinct probing signals may comprise respective perturbation signals generated by applying different frequency expansions to a common perturbation sequence.

A given error feedback embodiment may therefore share certain characteristics with a given SNR feedback embodiment. For example, in both embodiments, distinct probing signals derived from a common sequence are simultaneously utilized to estimate multiple channels based on measurements made at one or more receivers.

Time-domain processing of the measurements produces estimates of the crosstalk channel coefficients for each tone. More specifically, the result of the time-domain processing is an estimate of a weighted combination of the crosstalk coefficients of both lines. For error feedback, the probing sequence is a pilot sequence and the measurements are error samples, while for SNR feedback the probing sequence is a precoder perturbation sequence and the measurements are SNR values, although interference power or other types of interference information may alternatively be used. Taking advantage of the fact that the weights for one line as a function of frequency are different from the weights on the other line, crosstalk coefficients for a given line can be determined by applying an appropriate frequency-domain filter to the estimate of the weighted combination.

It should be noted that the invention can be implemented in embodiments that do not utilize error feedback or SNR feedback. For example, other embodiments may be implemented in which distinct probing signals are formed as distinct combinations of time sequences and frequency expansions. The term "frequency expansion" as used herein is intended to encompass a wide variety of arrangements in which the manner in which time sequence values are applied to tones varies as a function of frequency.

A more detailed example of an error feedback embodiment will now be described with reference to FIGS. 4 through 7.

Figure 5:
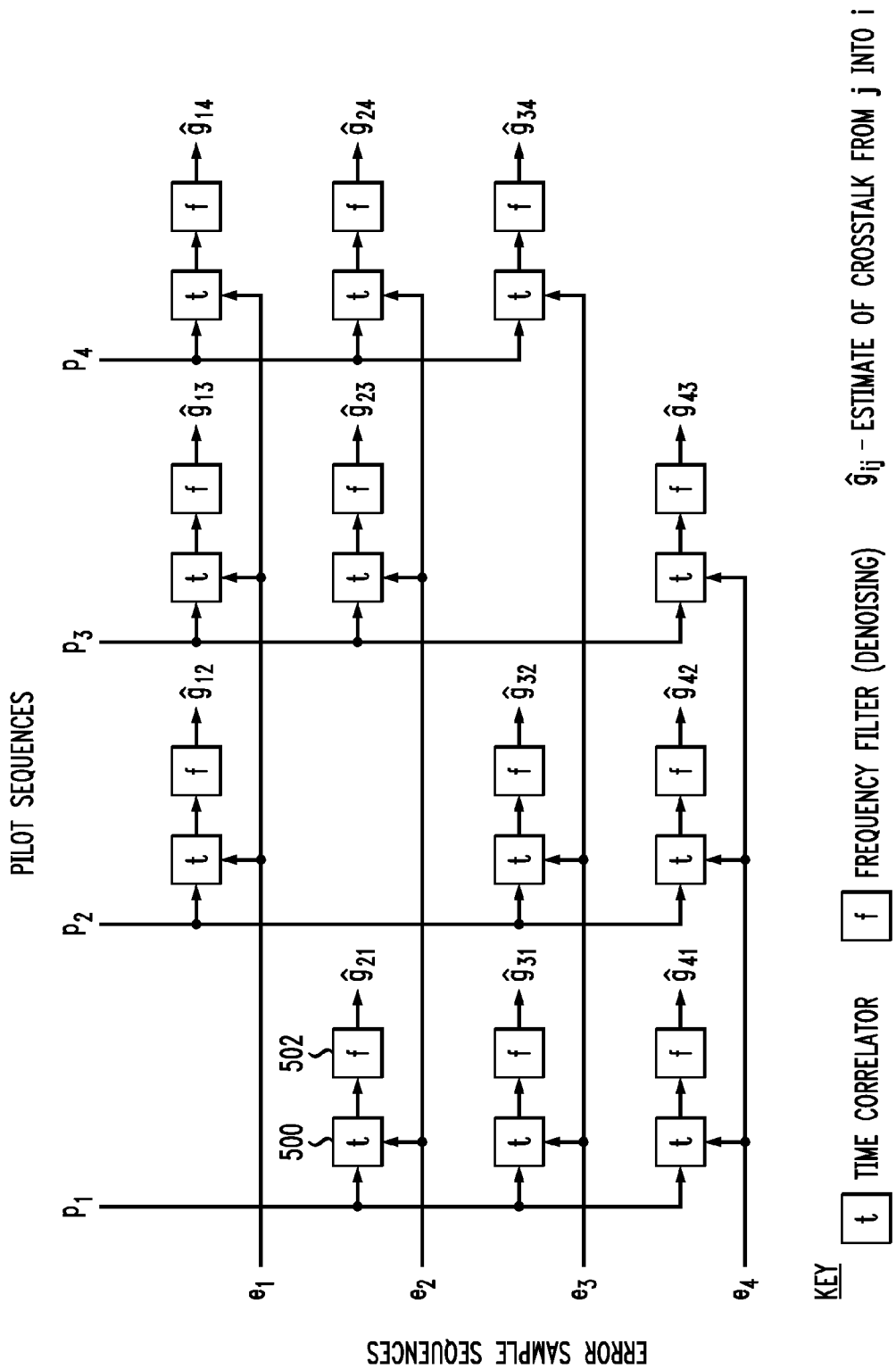
Figure 6:
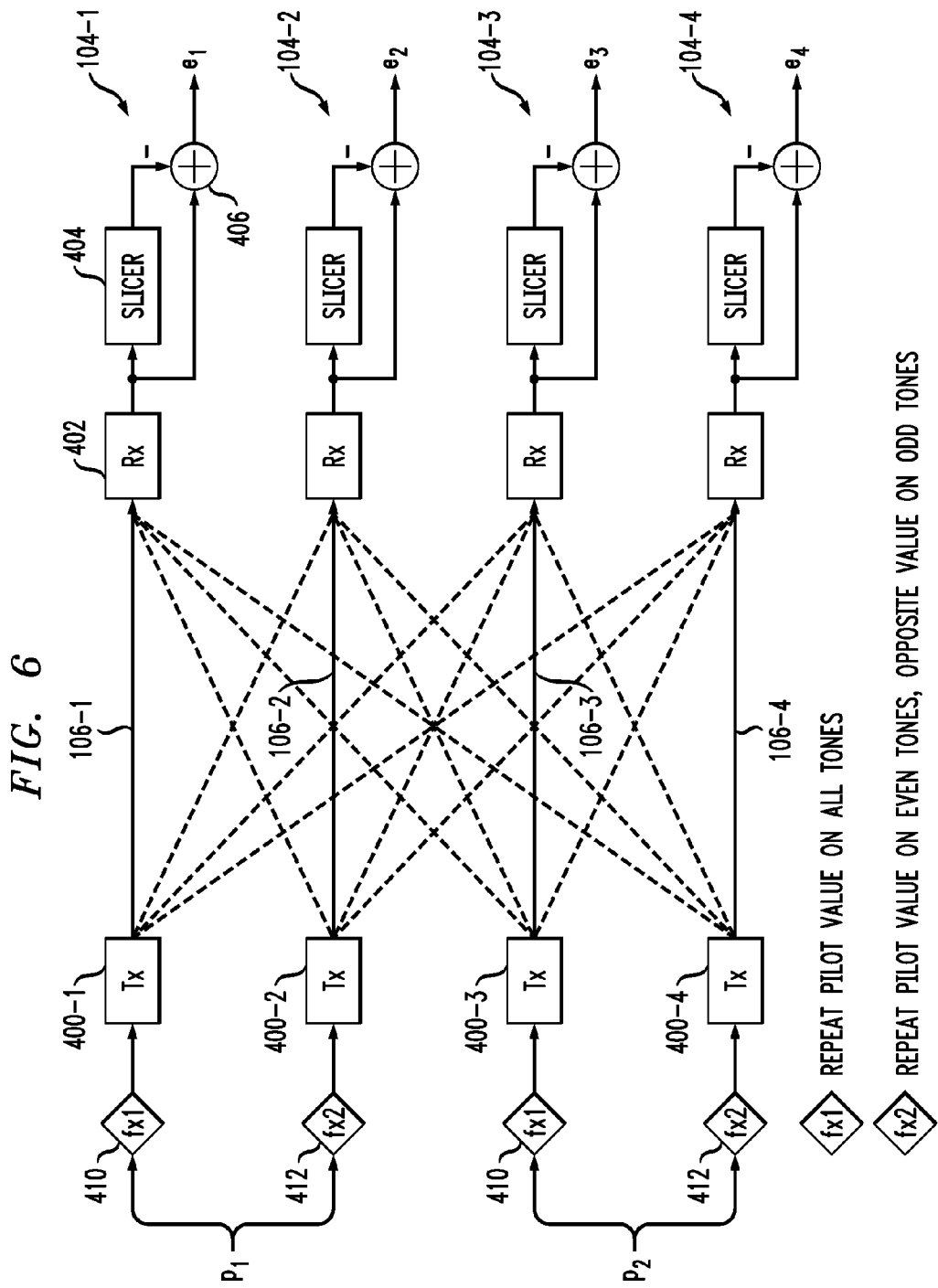
FIGS. 6 and 7 are block diagrams illustrating the manner in which the error feedback approach of FIGS. 4 and 5 may be adapted to implement simultaneous estimation of multiple channels using a common probing sequence in accordance with an illustrative embodiment of the invention.
Figure 7:
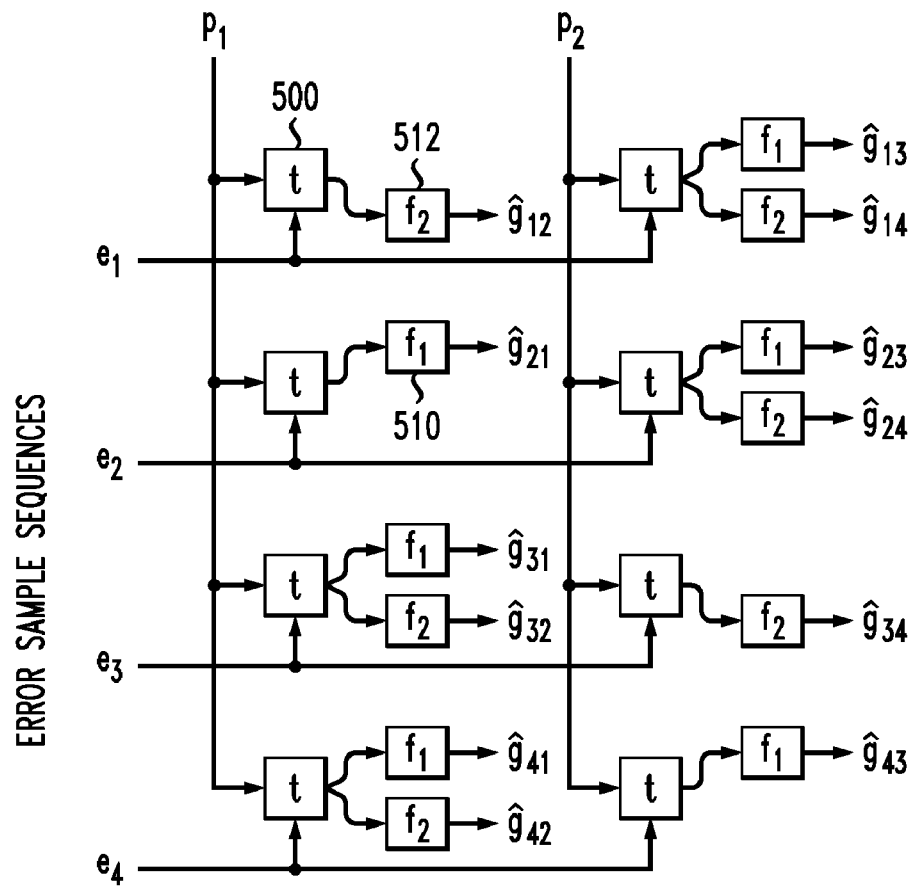

FIGS. 4 and 5 illustrate an error feedback approach for estimating crosstalk between four lines without use of simultaneous channel estimation. FIGS. 6 and 7 illustrate the manner in which the approach of FIGS. 4 and 5 is modified to implement simultaneous estimation of multiple channels.

Referring initially to FIG. 4, distinct probing signals are transmitted on four of the DSL lines 106-1 through 106-4 using respective transmitters 400-1 through 400-4. The distinct probing signals are transmitted to respective CPE 104-1 through 104-4. Each CPE in this example comprises a receiver 402, a slicer 404 and a signal combiner 406 arranged as shown. The distinct probing signals in this example are each generated using a different pilot sequence $p_1$, $p_2$, $p_3$ or $p_4$, in conjunction with a single frequency expansion 410, also denoted fx, which simply involves repeating the pilot values of the corresponding pilot sequence on all K tones of the associated line. The CPE 104-1 through 104-4 generate respective measurements in the form of error values $e_1$, $e_2$, $e_3$ or $e_4$ that are fed back to the CO 102 that is assumed to include transmitters 400-1 through 400-4. The error values are examples of what are more generally referred to herein as "error samples." The transmitters 400-1 through 400-4 may correspond to transmitters 204-1 through 204-4 of FIG. 2 and each may incorporate portions of controller 200, precoder 202, or other CO elements.

FIG. 5 illustrates the manner in which the CO 102 generates crosstalk estimates from the error values $e_1$, $e_2$, $e_3$ or $e_4$ fed back by the CPE 104. A given crosstalk estimate $\hat{g}_{ij}$ denotes the crosstalk from line j into line i, and is generated by first correlating error value $e_i$ with pilot sequence $p_j$ in a time correlator 500 and then denoising the correlation result in a frequency filter 502. The time correlators and frequency filters of FIG. 5 may be implemented in crosstalk estimate generator 110 of CO 102, possibly utilizing software executed by processor 115 and stored in memory 120. One skilled in the art would know how to implement such elements given the teachings provided herein.

As indicated previously, the arrangement of FIGS. 4 and 5 utilizes a different pilot sequence for each of the lines 106-1 through 106-4. It was mentioned above that, in order to transmit the pilot sequences simultaneously, the sequences must be linearly independent, and hence the length of each sequence must be at least as long as the number of sequences. In other words, the more distinct pilot sequences that are used, the longer those sequences need to be. Accordingly, the number of channel uses required to obtain the desired estimates in this arrangement is the same as the number of channels.

FIG. 6 illustrates how this arrangement can be significantly improved through the use of simultaneous estimation of multiple channels in accordance with an embodiment of the present invention. As in FIG. 4, distinct probing signals are transmitted on four of the DSL lines 106-1 through 106-4 using respective transmitters 400-1 through 400-4. The distinct probing signals are transmitted to respective CPE 104-1 through 104-4, each again comprising receiver 402, slicer 404 and signal combiner 406. However, the distinct probing signals in this example are each generated using a different combination of a distinct pilot sequence $p_1$ or $p_2$ with a distinct frequency expansion 410 or 412. The two distinct frequency expansions are also denoted fx1 and fx2, respectively. The first frequency expansion 410 is the same as the frequency expansion used in FIG. 4, and involves repeating the pilot values of the corresponding pilot sequence on all K tones of the associated line. The second frequency expansion 412 involves repeating the pilot values of the corresponding pilot sequence on all even-numbered tones of the associated line, and repeating opposite or inverted values of the corresponding pilot sequence on all odd-numbered tones of the associated line.

This arrangement advantageously allows the probing signals for lines 106-1 and 106-2 to simultaneously use a first common pilot sequence. Similarly, the probing signals for lines 106-3 and 106-4 simultaneously use a second common pilot sequence. As a result, the number of distinct pilot sequences is reduced by a factor of two, and the sequences only need to be half as long to be linearly independent. Thus, the number of channel uses required to obtain the desired channel estimates is reduced by a factor of two, to two channel uses from the four channel uses required without the simultaneous estimation.

The CPE 104-1 through 104-4 again generate respective measurements in the form of error values $e_1$, $e_2$, $e_3$ or $e_4$ that are fed back to the CO 102 that is assumed to include transmitters 400-1 through 400-4.

FIG. 7 illustrates the manner in which the CO 102 generates crosstalk estimates from the error values $e_1$, $e_2$, $e_3$ or $e_4$ fed back by the CPE 104. Again, a given crosstalk estimate $\hat{g}_{ij}$ denotes the crosstalk from line j into line i, and is generated by first correlating error value $e_i$ with an appropriate pilot sequence $p_1$ or $p_2$ in time correlator 500. However, different frequency filters 510 or 512 are then applied, depending upon the frequency expansion 410 or 412 used to generate the corresponding distinct probing signal. Like similar elements previously described herein, the time correlators and frequency filters of FIG. 7 may be implemented in crosstalk estimate generator 110 of CO 102, possibly utilizing software executed by processor 115 and stored in memory 120.

Of course, the error feedback approach with simultaneous estimation of multiple channels as illustrated in FIGS. 6 and 7 can be extended to a wide variety of other combinations of pilot sequences and frequency expansions. For example, three distinct frequency expansions can be used in a given system with N lines to reduce the number of channel uses by a factor of three, four distinct frequency expansions can be used to reduce the number of channel uses by a factor of four, and so on. Again, each distinct probing signal in a given such embodiment is generated as a distinct combination of a pilot sequence and a frequency expansion. Distinct probing signals generated from the same pilot sequence are transmitted simultaneously over their respective lines, and the corresponding error values may be simultaneously generated and fed back to the CO 102.

In a given error feedback embodiment, a fixed value of F may be used, such as, for example, F=2 or F=4. Existing DSL standards could be modified to support such an arrangement by providing that the pilot sequence can vary with frequency, and more particularly allowing the sequence to be periodic in frequency with specified period F. This would allow the various pilot sequence values to be detected robustly at the CPE, enabling high quality error feedback.

A more detailed example of an SNR feedback embodiment will now be described with reference to FIGS. 8 through 11.

Figure 8:
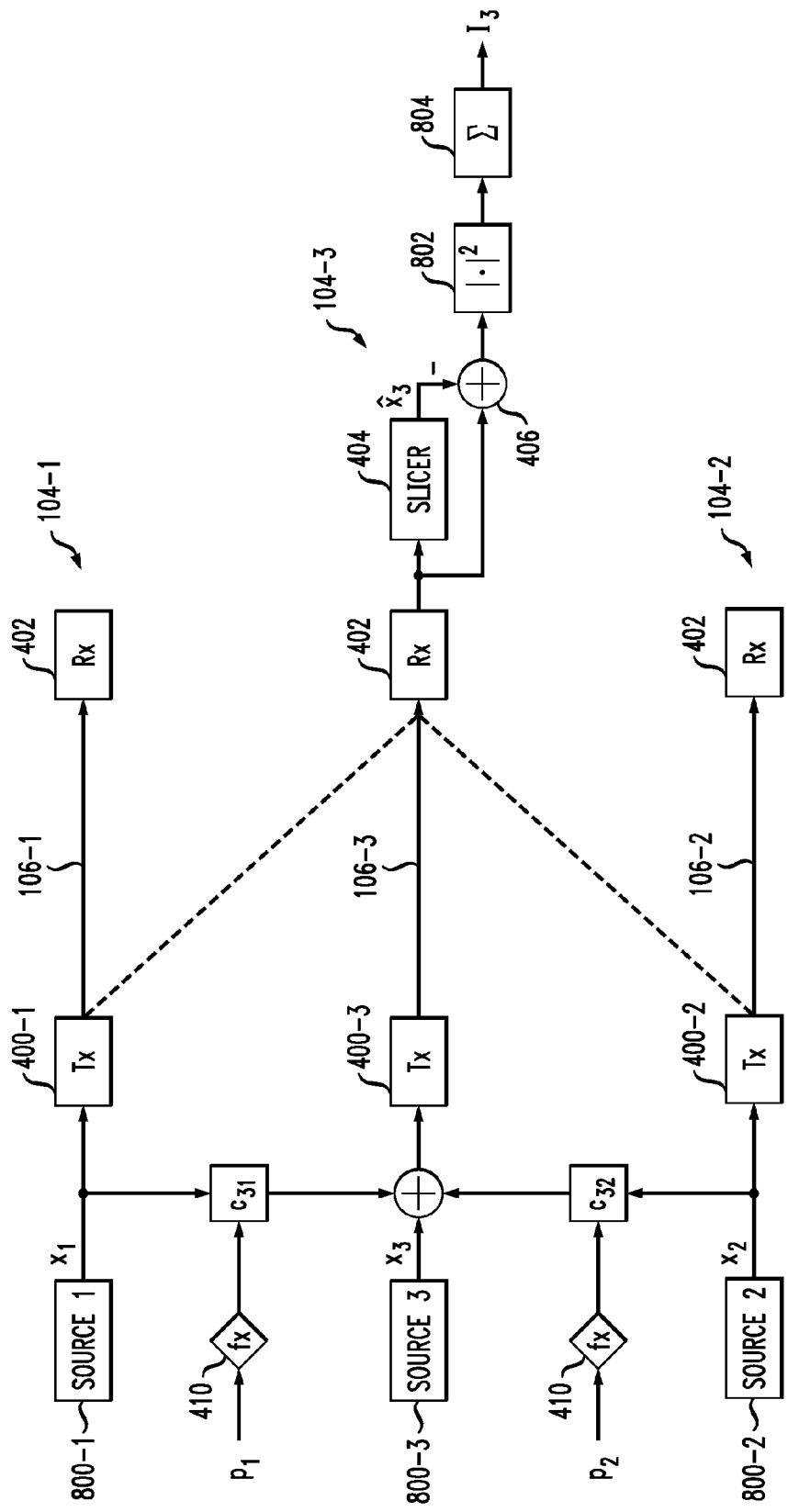
FIGS. 8 and 9 are block diagrams illustrating an SNR feedback approach to obtaining crosstalk estimates without the use of simultaneous estimation of multiple channels using a common probing sequence.
Figure 9:
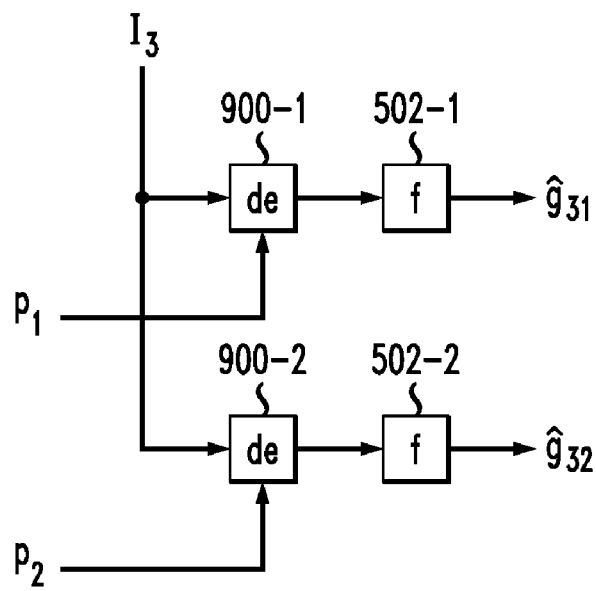
Figure 11:
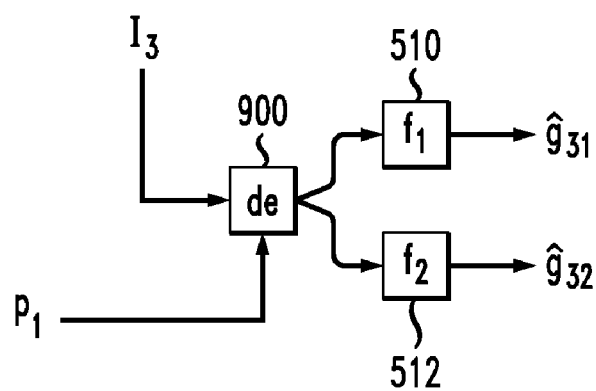
FIGS. 10 and 11 are block diagrams illustrating the manner in which the SNR feedback approach of FIGS. 8 and 9 may be adapted to implement simultaneous estimation of multiple channels using a common probing sequence in accordance with an illustrative embodiment of the invention.
Figure 10:
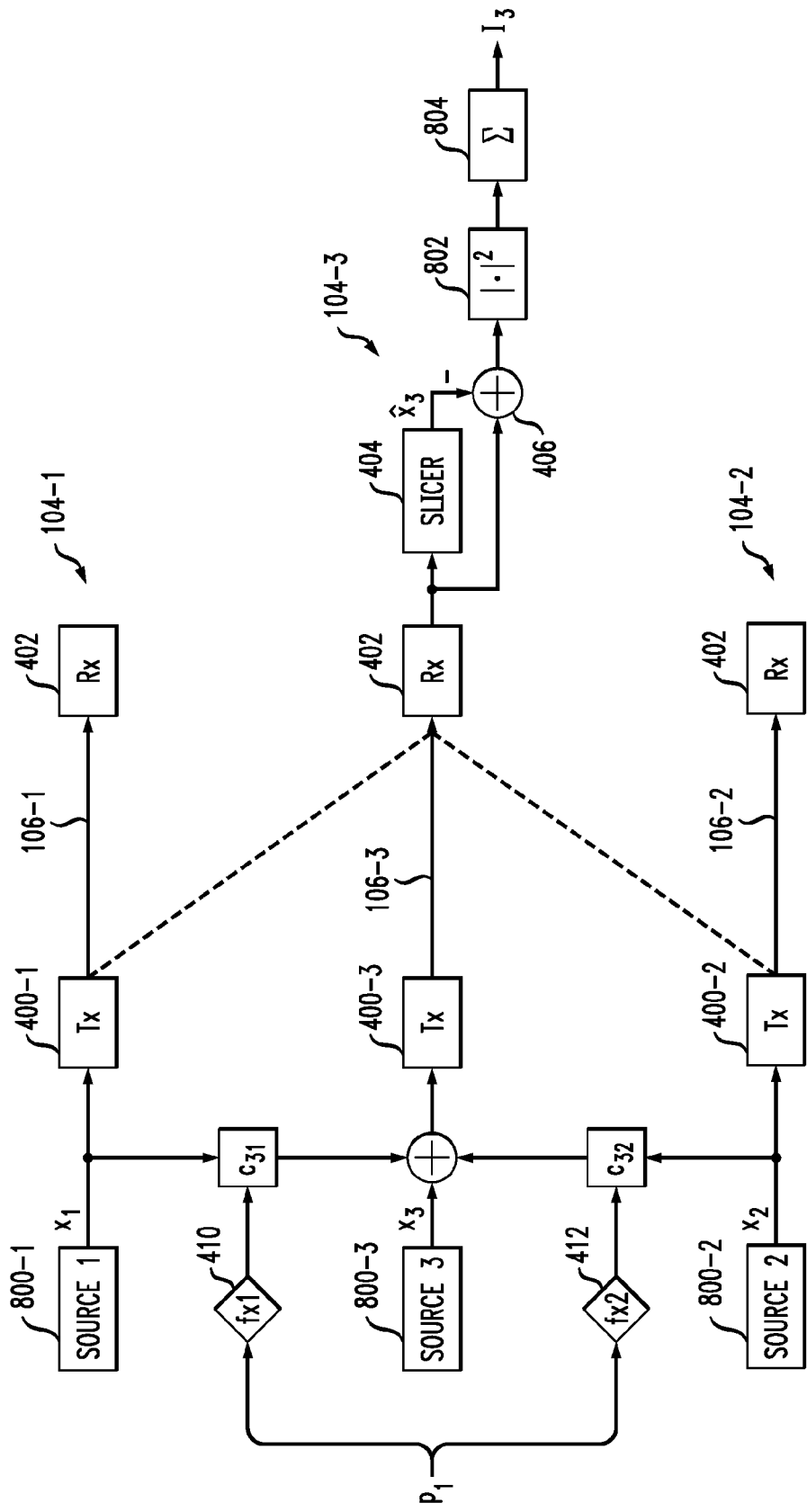

FIGS. 8 and 9 illustrate an SNR feedback approach for estimating crosstalk from two of the DSL lines 106-1 and 106-2 into a third one of the lines 106-3, without the use of simultaneous channel estimation. FIGS. 10 and 11 illustrate the manner in which the approach of FIGS. 8 and 9 is modified to implement simultaneous estimation of multiple channels in accordance with an illustrative embodiment of the invention.

Referring now to FIG. 8, signal sources 800-1, 800-2, and 800-3 generate constellation points $x_1$, $x_2$, and $x_3$, respectively. These may be modeled as random complex numbers, independent between lines and tones. The actual signal transmitted on line 106-3 is a precoded value $y_3 = x_3 + c_{31} x_1 + c_{32} x_2$, where $c_{31}$ and $c_{32}$ denote precoder coefficients. The received value in CPE 104-3, after compensating for direct channel gain, is the transmitted precoded value corrupted by crosstalk from the other two lines 106-1 and 106-2, and is given by:

$$r_3 = y_3 + g_{31} y_1 + g_{32} y_2 = x_3 + (c_{31} + g_{31}) x_1 + (c_{32} + g_{32}) x_2$$

At CPE 104-3, $x_3$ is estimated in slicer 404 and the estimate is subtracted from the received signal in signal combiner 406 to give the error signal. The magnitude squared of the error signal as generated in squaring element 802 is then accumulated in summation element 804 over a period of time to give an estimate of the total interference level on line 106-3 on each tone during that period. This interference level is denoted $I_3$ and is fed back to the CO 102 for further processing to generate corresponding crosstalk estimates.

In this exemplary SNR feedback approach, perturbation signals are applied to the precoder coefficients $c_{31}$ and $c_{32}$, and the corresponding changes in $I_3$ are observed. A difference estimator implemented in the CO 102 takes the perturbation signals and observed interference levels and estimates the crosstalk channel. As illustrated in FIG. 8, different perturbation sequences $p_1$ and $p_2$ are associated with respective lines 106-1 and 106-2. On each line, the perturbation sequences are expanded using the same frequency expansion 410 which involves repeating the same perturbation value on every tone. The perturbation sequences change the precoder coefficients from their nominal values for fixed periods of time.

FIG. 9 illustrates the manner in which the crosstalk estimates are generated. To form the estimate $\hat{g}_{31}$ of the crosstalk from line 106-1 into line 106-3, first a difference estimator ("de") 900-1 compares values of the perturbation sequence $p_1$ with the observed interference level $I_3$ on each tone, and then the result is denoised in a frequency filter 502-1. Similarly, to form the estimate $\hat{g}_{32}$ of the crosstalk from line 106-2 into line 106-3, another difference estimator 900-2 compares values of the perturbation sequence $p_1$ with the observed interference level $I_3$ on each tone, with the result being denoised in a frequency filter 502-2.

Typically, a common base value of zero can be used for all lines, two non-zero perturbation values are required for each line, and to keep the differential estimator simple, non-zero perturbation values from different lines are scheduled to occur at different times. Thus, typical perturbation sequences could be $p_1 = [0\ a\ ia\ 0\ 0]$ $p_2 = [0\ 0\ 0\ b\ ib]$ where a and b are complex numbers, and i is the unit imaginary number. In this particular type of approach, five SNR reports are required to estimate the crosstalk from two disturber lines into a victim line. The number of reports, and hence the time required, is roughly proportional to the number of disturber lines.

As noted above, the arrangement of FIGS. 8 and 9 utilizes different perturbation sequences for the disturber lines 106-1 and 106-2.

FIG. 10 illustrates how this arrangement can be significantly improved through the use of a single common perturbation sequence $p_1$ for both of the disturber lines 106-1 and 106-2 in an embodiment of the invention. The single perturbation sequence is combined with distinct frequency expansions 410 and 412 to generate distinct probing signals for lines 106-1 and 106-2. The frequency expansion 410, as described previously, involves repeating the perturbation sequence values on all tones. The frequency expansion 412 is different, and repeats the perturbation sequence values on all even tones, and corresponding inverted values on all odd tones. A typical perturbation sequence in this embodiment may comprise a base value of zero and two non-zero values, for example:

$p_1 = [0\ a\ ia]$.

With this sequence, only three SNR reports are required to estimate the crosstalk from two disturber lines into a victim line. Other types of perturbation sequences may be utilized in alternative SNR feedback embodiments of the invention.

FIG. 11 illustrates the manner in which the crosstalk estimates are generated from the interference measurements obtained in FIG. 10. The perturbation sequences and the measured interference $I_3$ are applied to a single difference estimator 900. The output of the estimator 900 is an estimate of $g_{31} + g_{32}$ on even tones, and an estimate of $g_{31} - g_{32}$ on odd tones. Two different frequency filters 510 and 512, also denoted $f_1$ and $f_2$, respectively, are therefore utilized to extract estimates of $g_{31}$ and $g_{32}$, respectively. These frequency filters 510 and 512 are the same as those utilized in the FIG. 7 embodiment.

The SNR feedback approach illustrated in FIGS. 10 and 11 allows the number of SNR reports to be significantly reduced, since multiple lines are estimated simultaneously utilizing the same perturbation sequence $p_1$. In general, if Q lines are estimated simultaneously with the same perturbation sequence, the number of reports is reduced by about a factor of Q. Thus, with a factor of Q=10, one could estimate crosstalk from ten lines simultaneously, leading to a significant reduction in the delay between switching on a CPE modem and obtaining maximum bandwidth.

The above-described illustrative embodiments advantageously provide a substantial reduction in the amount of time required to estimate N different channels, from multiple transmitters into a common receiver. For example, in the case of a given error feedback embodiment, the requirement reduces from N channel uses to N/F channel uses, where F is less than or equal to Q, the coherence bandwidth of the channel in tones. In typical DSL systems utilizing DMT with a tone spacing on the order of 4 kHz, values of Q=10 and higher are likely. Use of the inventive techniques in such a system can reduce the time required for estimating crosstalk from a large number of lines by an order of magnitude.

As indicated previously, the techniques disclosed herein are applicable to a wide variety of other types of communication systems. For example, OFDM systems are typically designed so that the frequency response is approximately constant across the width of one tone. This enables the response to be represented by a single complex coefficient. An implication is that the channel does not fluctuate very much over two tones, meaning that a value of at least Q=2 is expected to be widely attainable in OFDM systems in general.

Embodiments of the present invention may be implemented at least in part in the form of one or more software programs that are stored in a memory or other processor-readable medium of CO 102 or CPE 104 of system 100. Such programs may be retrieved and executed by a processor in the CO or CPE. The controller 200 may be viewed as an example of such a processor. Of course, numerous alternative arrangements of hardware, software or firmware in any combination may be utilized in implementing these and other systems elements in accordance with the invention.

It should again be emphasized that the embodiments described above are presented by way of illustrative example only. Other embodiments may use different communication system configurations, CO and CPE configurations, communication channels, and crosstalk estimate generation and crosstalk control process steps, depending on the needs of the particular communication application. Alternative embodiments may therefore utilize the techniques described herein in other contexts in which it is desirable to quickly obtain crosstalk coefficients for at least a subset of tones.

In the illustrative embodiment of FIG. 2, it is assumed that all of the lines are subject to precoding. However, other embodiments need not be so configured, and one or more lines may not have associated precoding. In an arrangement of this type, the disclosed techniques may be used to measure how much crosstalk would be caused in non-precoded active lines, and a determination may then be made to reduce the power level on certain tones that are giving rise to this interference.

It should also be noted that the particular assumptions made in the context of describing the illustrative embodiments should not be construed as requirements of the invention. The invention can be implemented in other embodiments in which these particular assumptions do not apply.

These and numerous other alternative embodiments within the scope of the appended claims will be readily apparent to those skilled in the art.

What is claimed is:

1. A method for use in a communication system comprising a plurality of transmitters and at least one receiver, the method comprising the steps of:
   simultaneously estimating channel coefficients between multiple ones of the transmitters and the receiver; and
   utilizing the estimated channel coefficients to control at least one data signal sent by at least one of the multiple transmitters to the receiver;
   wherein the step of simultaneously estimating channel coefficients further comprises the step of transmitting distinct probing signals each of which is generated based on a distinct combination of a same common probing sequence and a selected one of a plurality of different frequency expansions, such that the same common probing sequence is used in generating each of the distinct probing signals; and
   wherein the distinct probing signals each vary as a function of both time and frequency.

2. The method of claim 1 wherein the step of utilizing the estimated channel coefficients to control at least one data signal sent by at least one of the multiple transmitters to the receiver comprises the step of adjusting power levels of data signals sent by the multiple transmitters to respective receivers over respective channels of the system based on the estimated channel coefficients in order to control crosstalk between said channels.

3. The method of claim 1 wherein the step of utilizing the estimated channel coefficients to control at least one data signal sent by at least one of the multiple transmitters to the receiver comprises the step of adjusting precoder coefficients applied to data signals sent by the multiple transmitters to respective receivers over respective channels of the system based on the estimated channel coefficients in order to control crosstalk between said channels.

4. The method of claim 1 further comprising the step of utilizing the estimated channel coefficients to perform post-compensation of one or more received signals.

5. The method of claim 1 wherein the step of transmitting distinct probing signals each of which is generated based on a distinct combination of a common probing sequence and a selected one of a plurality of different frequency expansions further comprises the step of generating at least first and second distinct probing signals from the common probing sequence by applying a first frequency expansion to the common probing sequence to generate the first distinct probing signal and applying a second frequency expansion different than the first frequency expansion to the common probing sequence to generate the second distinct probing signal.

6. The method of claim 1 wherein the first and second frequency expansions each provide a different frequency modulation of the common probing sequence.

7. The method of claim 6 wherein the first and second distinct probing signals are transmitted simultaneously over respective first and second channels of the system.

8. The method of claim 6 wherein the first and second distinct probing signals are transmitted simultaneously over a single channel of the system.

9. The method of claim 7 wherein the first and second channels comprise first and second DMT channels each comprising a set of tones.

10. The method of claim 9 wherein the first frequency expansion applies a first probing sequence value to each tone in the set of tones of the first DMT channel.

11. The method of claim 1 wherein the distinct probing signals comprise respective pilot signals transmitted to respective receivers over respective channels of the system, and the common probing sequence comprises a common pilot sequence.

12. The method of claim 11 wherein the step of simultaneously estimating channel coefficients comprises processing error samples fed back from the receivers based on the transmitted pilot signals.

13. The method of claim 1 wherein the distinct probing signals comprise respective perturbation signals applied to respective precoder coefficients, and the common probing sequence comprises a common perturbation sequence.

14. The method of claim 13 wherein the step of simultaneously estimating channel coefficients comprises processing interference information fed back from the receiver based on the transmitted perturbation signals.

15. A method for use in a communication system comprising a plurality of transmitters and at least one receiver, the method comprising the steps of:
   simultaneously estimating channel coefficients between multiple ones of the transmitters and the receiver; and
   utilizing the estimated channel coefficients to control at least one data signal sent by at least one of the multiple transmitters to the receiver;
   wherein the step of simultaneously estimating channel coefficients further comprises the step of transmitting distinct probing signals each of which is generated based on a distinct combination of a common probing sequence and a selected one of a plurality of different frequency expansions;

wherein the first and second frequency expansions each provide a different frequency modulation of the common probing sequence;

wherein the first and second distinct probing signals are transmitted simultaneously over respective first and second channels of the system;

wherein the first and second channels comprise first and second DMT channels each comprising a set of tones; and wherein the second frequency expansion applies the first probing sequence value to each of a first subset of tones in the set of tones of the second DMT channel and applies an inversion of the first probing sequence value to each of a second subset of tones in the set of tones of the second DMT channel.

16. The method of claim 15 wherein the first subset comprises all even tones in the set of tones of the second DMT channel and the second subset comprises all odd tones in the set of tones of the second DMT channel.

17. An apparatus comprising:

an access node comprising a plurality of transmitters adapted for communication with at least one receiver;

the access node being operative to simultaneously estimate channel coefficients between multiple ones of the transmitters and the receiver, and to utilize the estimated channel coefficients to control at least one data signal sent by at least one of the multiple transmitters to the receiver;

wherein the access node in simultaneously estimating the channel coefficients transmits a plurality of distinct probing signals each of which is generated based on a distinct combination of a same common probing sequence and a selected one of a plurality of different frequency expansions, such that the same common probing sequence is used in generating each of the distinct probing signals; and wherein the distinct probing signals each vary as a function of both time and frequency.

18. The apparatus of claim 17 wherein the access node comprises a processor coupled to a memory with the processor being configured to control said simultaneous estimation of the channel coefficients and said utilization of the channel coefficients in accordance with executable program code stored in said memory.

19. The apparatus of claim 17 wherein the access node comprises at least a portion of at least one central office of a DSL system.

20. The apparatus of claim 17 wherein the distinct probing signals comprise respective pilot signals transmitted to respective receivers over respective channels of the system, and the common probing sequence comprises a common pilot sequence.

21. The apparatus of claim 17 wherein the distinct probing signals comprise respective perturbation signals applied to respective precoder coefficients, and the common probing sequence comprises a common perturbation sequence.

* * * * *